(12) United States Patent
Unucheck et al.

(10) Patent No.: US 12,164,713 B2
(45) Date of Patent: Dec. 10, 2024

(54) OPTICAL STYLUS FOR OPTICAL POSITION DETERMINATION DEVICE

(71) Applicant: FRESHAPE SA, Villaz-St-Pierre (CH)

(72) Inventors: Dmitrii Unucheck, Villaz-St. Pierre (CH); Guillaume Guerin, Villaz-St. Pierre (CH); Leonardo Lessa, Villaz-St. Pierre (CH); Yuhang Liu, Villaz-St. Pierre (CH)

(73) Assignee: FRESHAPE SA, Villaz-St-Pierre (CH)

( * ) Notice: Subject to any disclaimer, the term of this patent is extended or adjusted under 35 U.S.C. 154(b) by 0 days.

(21) Appl. No.: 18/025,189

(22) PCT Filed: Sep. 23, 2021

(86) PCT No.: PCT/IB2021/058679
§ 371 (c)(1),
(2) Date: Mar. 8, 2023

(87) PCT Pub. No.: WO2022/064412
PCT Pub. Date: Mar. 31, 2022

(65) Prior Publication Data
US 2023/0333677 A1    Oct. 19, 2023

(30) Foreign Application Priority Data
Sep. 28, 2020    (EP) .................................... 20198791

(51) Int. Cl.
*G06F 3/038* (2013.01)
*G06F 3/03* (2006.01)
*G06F 3/0354* (2013.01)

(52) U.S. Cl.
CPC .......... *G06F 3/0386* (2013.01); *G06F 3/0304* (2013.01); *G06F 3/03545* (2013.01)

(58) Field of Classification Search
CPC . G06F 3/0386; G06F 3/03545; G06F 3/03542
See application file for complete search history.

(56) References Cited

U.S. PATENT DOCUMENTS 10,318,034 B1 * 6/2019 Hauenstein ......... G06F 3/04842
2007/0003168 A1 * 1/2007 Oliver ................. G06F 3/03545
382/314

(Continued)

FOREIGN PATENT DOCUMENTS

CN    108664153 A    10/2018

*Primary Examiner* — Ariel A Balaoing
(74) *Attorney, Agent, or Firm* — Robert C. Netter, Jr.; Dann, Dorfman, Herrell & Skillman (57) ABSTRACT

The invention relates to an optical stylus (10) for an optical position determination device (1) comprising a position-encoded surface (50) having different position-encoding patterns (52). The optical stylus (10) comprises a housing (12) including: an image sensor (20) for capturing at least one image of any position-encoding pattern (52) of the position-encoded surface (50): an optical arrangement (15) comprising a dynamic optical element (16) configured to be electrically actuated in order to adjust the focal length of the optical stylus (10) as a function of a separation distance (D) between a reference point of the optical stylus (10) and the position of any position-encoding pattern (52) to have a substantially in-focus position-encoding pattern (52) corresponding to the position of the optical stylus (10), and a control unit (24) to control the dynamical optical element (16). The optical stylus further comprises a distance measurement sensor (32) to measure the separation distance (D). The control unit (24) is adapted for actuating the dynamic optical element (16) to adjust the focal length of the optical stylus (10) as a function of the output signal of the distance measurement sensor (32).

20 Claims, 5 Drawing Sheets

(56) References Cited

U.S. PATENT DOCUMENTS

| | | | |
|---|---|---|---|
| 2007/0076953 A1* | 4/2007 | Gonzalez | G06K 17/0032 |
| | | | 382/188 |
| 2010/0085471 A1* | 4/2010 | Craven-Bartle | G06F 3/0321 |
| | | | 348/E5.022 |
| 2012/0229384 A1* | 9/2012 | Nakane | G06F 3/03545 |
| | | | 345/158 |
| 2013/0125068 A1* | 5/2013 | Harris | G06F 3/03545 |
| | | | 345/173 |
| 2014/0231526 A1 | 8/2014 | Ishigami | |
| 2014/0292673 A1* | 10/2014 | Tsai | G06F 3/03545 |
| | | | 345/173 |
| 2014/0340328 A1 | 11/2014 | Kameyama et al. | |
| 2018/0032161 A1* | 2/2018 | Shi | G01S 5/22 |
| 2019/0302965 A1 | 10/2019 | Higashi | |
| 2020/0264710 A1* | 8/2020 | Thomas, III | G06F 3/0321 |

* cited by examiner

OPTICAL STYLUS FOR OPTICAL POSITION DETERMINATION DEVICE

The present application is § 371 application of PCT/IB2021/058679, filed Sep. 23, 2021, which claims priority to EP application Ser. No. 20/198,791.4, filed Sep. 28, 2020. The entire disclosure of each of the foregoing applications is incorporated by reference herein.

FIELD OF THE INVENTION

The present invention relates to an optical stylus for an optical position determination device and to an optical position determination device comprising the optical stylus and a position-encoded surface for accurate two and three-dimensional position determination of the optical stylus relative to the position-encoded surface. The invention also concerns a method of determining three-dimensional coordinates of an optical stylus relative to a position-encoded surface.

DESCRIPTION OF RELATED ART

Among user input devices, touch-sensitive displays provide the most natural way for human-computer interaction through simple gestures, signs or even hand-written text. In general, the use of a finger as an input device results in an imprecise outcome. Styli are widely used for more accurate data input.

However, independently of the technology used, most of the existing stylus have various limitations and require either physical contact or a very small separation between a pen and a screen. The scope of their application therefore remains limited to rough graphical input within a two-dimensional plane.

US20200264710 discloses an electro-optical pen capable of determining a distance between a pen and scribing plane using different imaging processing techniques such as triangulation, field of view overlapping, dots cross-correlation or stereograph image processing techniques.

US2010/085471 discloses a camera pen switchable between different operating modes. The pen may be used in a contact mode to read data off the object surface with the pen in physical contact with the object surface. The pen may also be used in a hover mode, whereby the pen may be controlled to output three-dimensional position data thereby allowing the pen to be used for 3D application. The camera includes a variable focal lens whose focal length is controlled as a function of the object distance given by a parameter derived from a previously captured image. The camera pen therefore uses an image processing approach to derive the object distance.

Similarly, CN1086641553 discloses a camera pen for 2D and 3D applications which uses an image processing approach to derive the object distance for 3D applications.

An aim of the present invention is to provide a versatile optical stylus for 2D and 3D applications using an alternative approach to determine the object distance for 3D application.

This versatile optical stylus is advantageously adapted for applications such as 3D engineering design, technical sketching, artistic drawings or calligraphy.

BRIEF DESCRIPTION OF THE INVENTION

This aim is achieved by an optical stylus for an optical position determination device comprising a position-encoded surface having different position-encoding patterns. The optical stylus comprises: an image sensor for capturing at least one image of any position-encoding pattern of the position-encoded surface; an optical arrangement comprising a dynamic optical element configured to be electrically actuated in order to adjust the focal length of the optical stylus as a function of a separation distance between a reference point on the optical stylus and the position of any position-encoding pattern to have a substantially in-focus position-encoding pattern corresponding to the position of the optical stylus; a control unit to control the dynamical optical element, and an aperture or a window at a distal end of the optical stylus. The optical stylus is adapted to identify any substantially in-focus encoding-pattern of the position-encoded surface independently of the separation distance for position determination of the optical stylus relative to the surface. The optical stylus further comprises a distance measurement sensor to measure the separation distance. The control unit is adapted for actuating the dynamic optical element to adjust the focal length of the optical stylus as a function of the output signal of the distance measurement sensor.

In an embodiment, the control unit is configured to control the dynamic optical element according to either of the two following modes:
- a 3D mode, wherein an electrical signal is applied to the dynamic optical element, the power of the electrical signal varying as a function of the separation distance to vary the focal length of the optical stylus accordingly, and
- a 2D mode, wherein no electrical signal is applied to the dynamic optical element such that the focal length of the optical stylus remains constant and any encoding-pattern is substantially in-focus when the distal end of the optical stylus is in contact or within a range up to 5 mm to the position-encoded surface.

In an embodiment, the control unit is configured to switch the optical stylus between the 2D mode and 3D mode and vice versa as a function of the output signal of the distance measuring sensor.

In an embodiment, the optical stylus further comprises a functional button electrically connected to the control unit to switch the optical stylus between the 2D mode and the 3D mode and vice versa.

In an embodiment, the optical stylus further comprises a pressure sensor located in the tip of the stylus. The control unit is configured to switch the optical stylus between the 2D mode and 3D mode and vice versa as a function of the output signal of the pressure sensor.

In an embodiment, the distance measurement sensor is a time-of-flight sensor.

In an embodiment, the dynamic optical element is a liquid or polymer lens electrically actuable to adjust the focal length of the optical stylus.

In an embodiment, the dynamic optical element is a fixed-focus lens mounted on an actuator configured to shift the fixed-focus lens along an optical path of the optical stylus to adjust its focal length.

In an embodiment, the actuator is a piezoelectric element.

In an embodiment, the optical stylus further comprises at least one light emitting unit adapted to illuminate any position-encoding pattern.

In an embodiment, the optical stylus further comprises an Inertial Measurement Unit.

In an embodiment, the optical stylus further comprises a battery and an electrical circuit including the control unit, the image sensor and a memory. The memory stores an image processing and/or a pattern recognition algorithm for determining the position of the optical stylus relative to the position-encoded surface.

In an embodiment, the optical stylus further comprises at a distal end a specific shape for writing, painting or calligraphy application. The specific shape is in the form of a brush comprising a bundle of filaments or another flexible tip or a pen-like tip. The aperture or window is located at the distal end of the optical stylus such that an image of both specific shape and corresponding position-encoding pattern may be captured together by the image sensor.

Another aspect of the invention relates to an optical position determination device comprising the optical stylus and a host device comprising a screen, and a position-encoded surface having different position-encoding patterns. The host device is configured to receive position-related data from the optical stylus to generate on the screen a trace following the motion of the optical stylus relative to the position-encoded surface.

In an embodiment, the position encoded surface is an integral part of the host device.

In an embodiment, the position encoded surface is made of a flexible material applied on the screen top surface of the host device.

In an embodiment, the optical position determination device comprises a stand-alone position encoded surface.

In an embodiment, the different position-encoding patterns of the position-encoded surface are transparent in the visible range of the light spectrum.

In an embodiment, the host device or the stand-alone position encoded surface comprises one light or more light sources, configured to emit light outside the visible range of the light spectrum and arranged below the position-encoded surface to back illuminate each of the position-encoding patterns.

Another aspect of the invention relates to a method of determining the position of an optical stylus relative to a position-encoded surface comprising different position-encoding patterns. The optical stylus comprises: an image sensor for capturing at least one image of any position-encoding pattern of the position-encoded surface; an optical arrangement comprising a dynamic optical element configured to be electrically actuated; a distance measurement sensor for measuring a separation distance between a reference point of the optical stylus and the position of any position-encoding pattern, and a control unit to control the dynamic optical element. The method comprises the steps of: a. holding the optical stylus in the direction of the position-encoded surface, b. actuating the dynamic optical element to adjust the focal length of the optical stylus as a function of the output signal of the distance measurement sensor, c. acquiring by the image sensor the optical signal of the image formed by the optical arrangement of a substantially in-focus position-encoding pattern of the position-encoded surface, and d. processing the optical signal to determine the position of the optical stylus relative to the position-encoded surface.

In an embodiment, the optical stylus further comprises a gyroscope and/or an accelerometer. The position of the optical stylus is computed based on both the optical signal acquired by the image sensor and data acquired by the gyroscope and/or accelerometer or based solely on data acquired by the gyroscope and/or accelerometer.

In an embodiment, orientation of the optical stylus is measured by the gyroscope and/or the accelerometer, at least during the acquisition of the optical signal under step c.

In an embodiment, the tilt angle of the optical stylus is used for example for correction of perspective distortion of the captured encoding pattern to provide a more robust pattern recognition and position determination.

In an embodiment, the optical stylus further comprises a light emitting unit. The light intensity of the light emitting unit is controlled as a function of the output signal of the distance measurement sensor.

In an embodiment, data representing image perspective of any of the position-encoding patterns captured by the image sensor are wirelessly sent to a host device comprising a screen and configured to run a computer vision algorithm for determining the position of the optical stylus prior displaying a trace on the screen following the relative movement of the optical stylus relative to the position-encoded surface.

In an embodiment, data representing image perspective of any of the position-encoding patterns captured by the image sensor are processed by a processing unit of the optical stylus which runs a computer vision algorithm for determining the position of the optical stylus prior wirelessly sending to the host device position-related data for displaying a trace on the screen following the relative movement of the optical stylus relative to the position-encoded surface.

In an embodiment, the hue, stroke width and/or shape of said trace is modulated as a function of any or a combination of two or more of the following parameters of the optical stylus: speed, acceleration, orientation and tip pressure on the position-encoded surface.

BRIEF DESCRIPTION OF THE DRAWINGS

The invention will be better understood with the aid of the description of several embodiments given by way of examples and illustrated by the figures, in which.

DETAILED DESCRIPTION OF SEVERAL EMBODIMENTS OF THE INVENTION

Figures 1, 2, 2A:
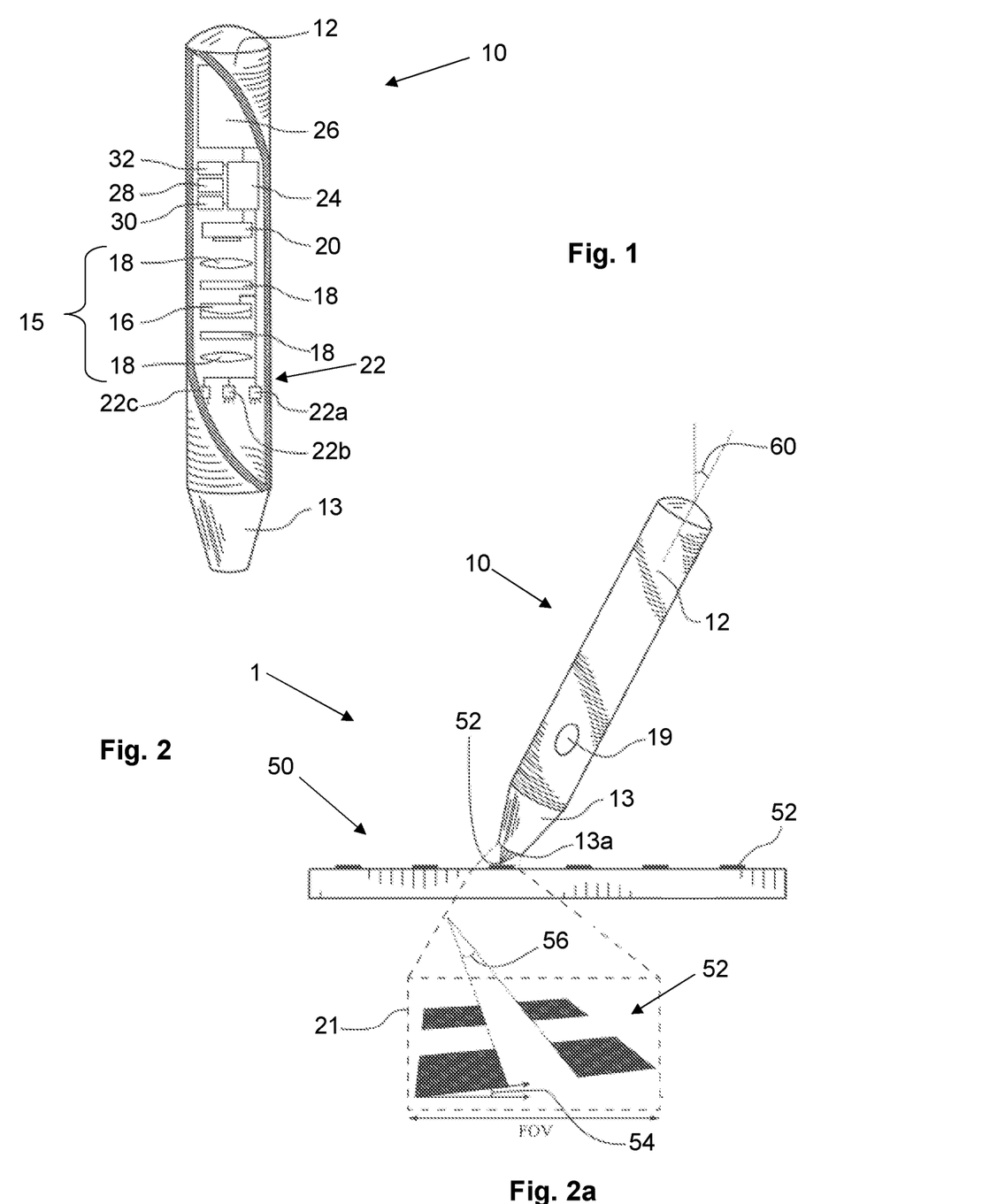
FIG. 1 shows a schematic elevational view of an optical stylus according to an embodiment of the invention with a partial cross-sectional view.
FIG. 2 shows an elevational view of the optical stylus of FIG. 1 in a short-focal length configuration in which a distal end of the optical stylus is in close proximity of the position-encoded surface.
FIG. 2a is an image of a position-encoding pattern captured by the image sensor of the optical stylus in the configuration shown in FIG. 2.

The optical stylus 10 of FIG. 1 is configured to determine its position relative to a position-encoded surface 50. Within the context of the present invention, the term "position" of the optical stylus shall be understood as any of the following (1)-(3) or a combination thereof: (1) two-dimensional (2D) coordinates of a reference point of the optical stylus relative to the position-encoded surface, (2) distance between a reference point of the optical stylus and the position-encoded surface and (3) orientation of the optical stylus relative to the position-encoded surface, wherein the orientation may be expressed in Euler angles, in yaw, pitch and roll angles, in quaternions or in rotation matrices.

With reference to FIG. 1, the optical stylus 10 comprises a housing 12 containing an optical arrangement 15 for light beams shaping. The optical arrangement 15 comprises a dynamic optical element 16 and other optical components 18 comprising for example lens, optical filter, aperture and mirrors. The dynamic optical element 16 together with the other optical components 18 are disposed on an optical path of the optical stylus 10 to adjust optimally the focal length of the optical stylus 10 as a function of a separation distance D separating a reference point on the optical stylus 10, for example a distal end of the optical stylus from a position-encoded surface 50 comprising position-encoding patterns 52 as shown for example in FIG. 4.

Position-encoding patterns 52 may be for example in form of tags encoding the X-Y two-dimensional coordinate grid or in the form of different patterns which can be decoded back to the coordinates of particular position on the position-encoded surface 50.

As an alternative, position-encoding patterns 52 may be in form of unique tags or signs which can be univocally assigned to a particular position on the position-encoded surface 50. A look-up table comprising a series of corresponding unique tags or sign, and data relative to the position of each unique pattern or sign of the encoded surface, may be stored in a memory which may be integrated into the housing 12 of the optical stylus or in a host device in communication with the optical stylus to receive unprocessed optical signal from the optical stylus corresponding to a unique tag or sign. In an embodiment, 2D position of the optical stylus (i.e. 2D coordinates of the distal end of the optical stylus relative to the position-encoded surface) may be determined by comparing the tag or sign of the position-encoded surface 50 with the series of corresponding unique tags or signs contained in the look-up table. The separation distance D may be determined by estimating the relative size of the imaged position-encoding patterns or by estimating the field of view, while the orientation of the optical stylus may be estimated by analysing perspective distortions of the imaged position-encoding pattern. Other methods and/or additional sensors may be employed for determination of the optical stylus position.

The adjustment of the focal length of the optical arrangement 15 of the optical stylus 10 is performed such that the object plane is shifted to have a substantially in-focus position-encoding pattern 52 corresponding to the position of the optical stylus 10 relative to the position-encoded surface 50. Within the context of the present invention, the term "substantially in-focus position-encoding pattern" should be construed such that the position-encoding pattern may be slightly out of focus but still identifiable by a pattern recognition software as described subsequently.

Figures 3, 3A, 3B:
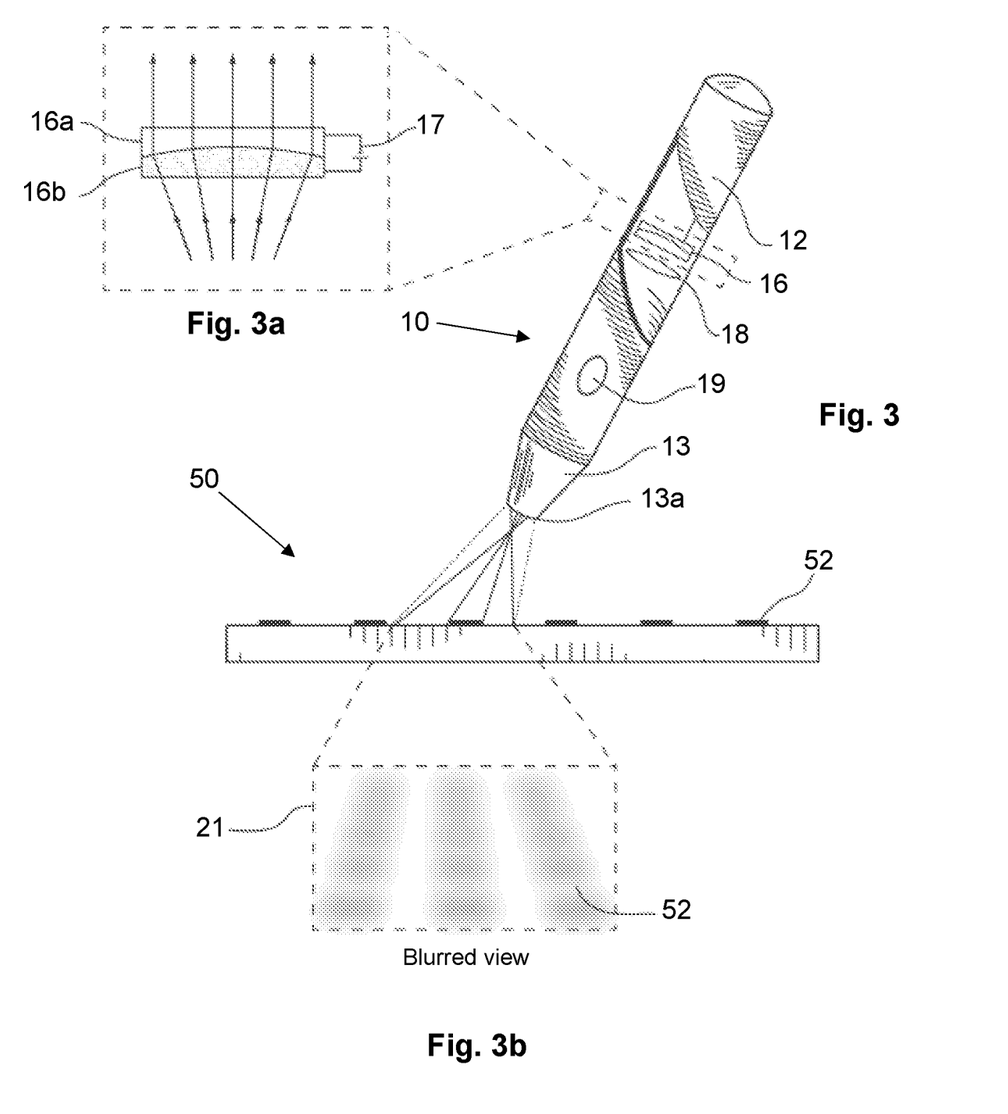
FIG. 3 shows an elevational view of the optical stylus of FIG. 1 in a short-focus configuration with a partial section view showing a tunable liquid lens, when the optical stylus is away from the position-encoded surface in a defocused state.
FIG. 3a shows a cross-sectional view of the tunable liquid lens when a first tension is applied on the lens to form a convex curvature of the interface between two liquids.
FIG. 3b shows an image of a position-encoding pattern captured by the image sensor of the optical stylus in the configuration shown in FIG. 3.

The object plane of the optical arrangement 15 may be for example parallel within a range up to 5 mm from a plane containing a position-encoding pattern 52 such that the latter is distinct enough, although possibly slightly out of focus and blurred, to be identified by the pattern recognition software. The object plane may also be tilted with respect to the plane containing a position-encoding pattern 52 such that only a part of the image of the pattern 52 is in focus. The part of the image in focus may still allow the pattern to be identified by the pattern recognition software An image sensor 20 (FIG. 1), for example a CCD, a CMOS sensor or an array of photo diodes, is mounted inside the housing 12 on the stylus optical path to capture images of the position-encoding patterns 52 as shown for example in FIGS. 2, 2a. For 3D applications, such as 3D-engineering design, technical sketching, artistic drawings or calligraphy, the focal length of the optical arrangement 15 of the optical stylus 10 must be constantly adjusted adequately to avoid out of focus position-encoding patterns 52, as shown in FIG. 3b, which would not be identifiable by any pattern recognition software.

In an embodiment, the dynamic optical element 16 is an electrically tunable liquid lens. The electrical signal applied on the tunable liquid lens 16 determines the curvature of the interface between two liquids 16a, 16b with different refractive indices as schematically shown for example in FIGS. 3a and 4a.

In another non-illustrated embodiment, the dynamic optical element is an optical lens with a fixed focal lens. The optical lens is arranged to be shifted along the optical path of the optical stylus by an actuator, for example by a piezoelectric element.

Figures 4, 4A:
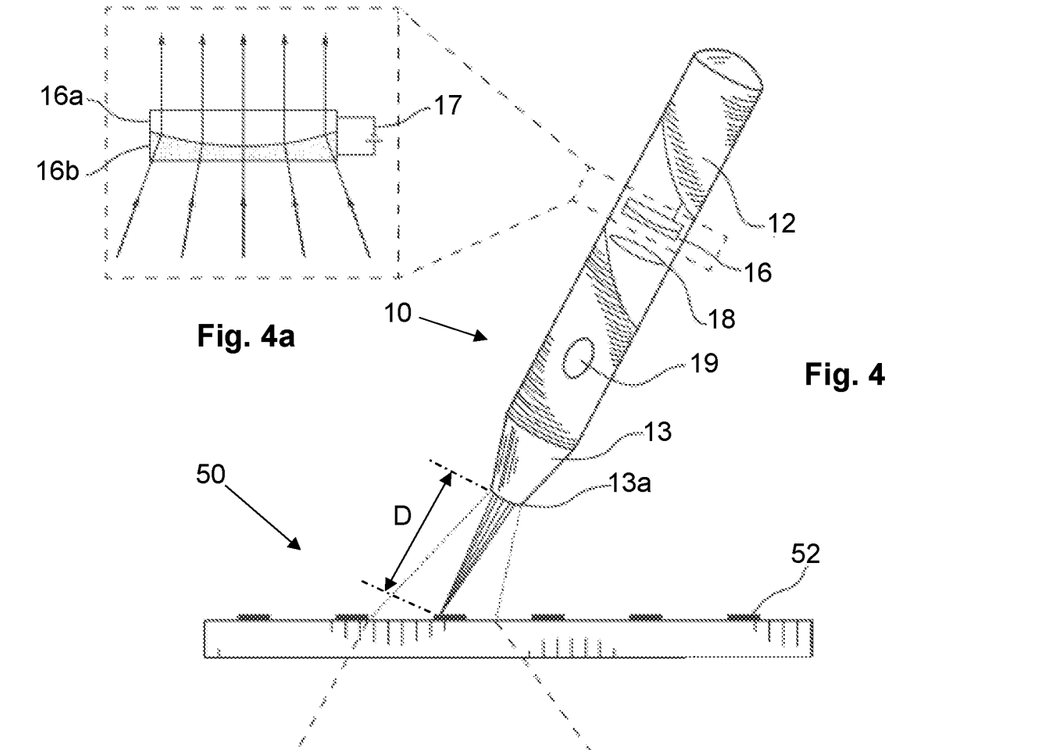
FIG. 4 shows an elevation view of the optical stylus of FIG. 1 in a focused configuration when the stylus is away from the position-encoded surface with a partial section view showing the tunable liquid lens.
FIG. 4a shows a cross-sectional view of the tunable liquid lens when a second tension is applied on the lens to form a concave curvature of the interface between the two liquids.
Figure 4B:
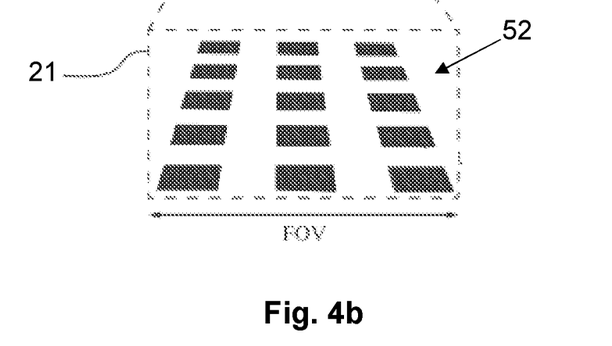
FIG. 4b shows a position-encoding pattern captured by the image sensor of the optical stylus in the configuration shown in FIG. 4.

With reference to FIGS. 4, 4a and 4b, the tunable liquid lens 16 is electrically actuated as a function of a separation distance D between a reference point on the optical stylus 10, for example a distal end of the optical stylus, and the position of any position-encoding pattern 52 of the position-encoded surface 50 to bring in-focus the position-encoding pattern 52 corresponding to the position of the optical stylus 10. The focal adjustment to bring the position-encoding pattern 52 in-focus may be achieved according to an open-loop or a closed loop configuration.

In the open loop configuration, the housing 12 of the optical stylus 10 may comprise a distance measurement sensor 32, as shown in FIG. 1, which may be for example a time-of-flight sensor, a laser sensor, a PDAF sensor or ultrasonic sensor. The distance measurement sensor 32 is configured to measure a distance between the reference point on the optical stylus 10 and the position of any position-encoding surface 52 which is correlated to the separation distance D.

The housing 12 of the optical stylus 10 comprises a control or a processing unit 24 configured to constantly control the electrical signal power applied to the tunable lens 16, for instance, in order to change the curvature of the interface between the two liquids 16a, 16b so as to modify the focal length of the lens 16 based on the output of the distance measurement sensor 32.

In the closed loop configuration, the dynamic optical element 16 is electrically actuated as a function of an autofocus algorithm run by the processing unit 24, such as a contrast optimization autofocus algorithm, or a phase detection autofocus algorithm. In the case of contrast optimization algorithm, if the image captured by the image sensor 20 is blurry as shown in FIG. 3b, an electrical signal is applied on the tunable liquid lens 16 or on the piezoelectric element in order to change the focal length of the optical arrangement 15 of the optical stylus 10. If this improves image contrast (positive gradient), an even higher electrical signal is applied on the liquid lens 16 until an optimal point is found (point of zero gradient). In an advantageous embodiment, the dynamic optical element 16 is actuated as a function of both the output of signal of the distance measurement sensor 32 and parameters obtained from an autofocus algorithm in order to obtain a more robust position of the optical stylus.

The optical stylus 10 may advantageously comprise a functional button 19, as illustrated in FIGS. 2 to 4, configured to switch the optical stylus 10 from a 2D mode for 2D applications to a 3D mode for 3D applications and vice and versa so that the position of the optical stylus 10 relative to the position-encoded surface 50 may be determined effectively in both 2D and 3D mode for the selected application.

In the 2D mode, no electrical signal is applied to the dynamic optical element 16 such that the focal length of the optical arrangement 15 of the optical stylus 10 remains constant and any encoding-pattern 52 is substantially in-focus when the distal end of the optical stylus is in contact or within a range up to 5 mm from the position-encoded surface 50. The 2D mode is therefore energy efficient since the focal length is not adjusted by applying a varying electrical signal to the dynamic optical element 16. For exclusively 2D applications, the dynamic optical element can be replaced with a fixed-focus lens.

Placing the optical stylus 10 further away from the position-encoded surface 50, when the optical stylus 10 is in a 2D mode, would make detection of position-encoding patterns 52 more difficult or even impossible. This is schematically illustrated in FIG. 3 as diverging light beams represent a defocused optical stylus 10 and one or more images 21 of any position-encoding pattern 52 acquired by image sensor 20 of the optical stylus 10 in this position would reveal a blurred position-encoding pattern 52 (FIG. 3d). The 2D mode corresponds to touch-sensitive optical position input systems according to the prior art because the optical stylus 10 can operate only in close proximity from the position-encoded surface 50 similarly to the conventional touch-sensitive technologies.

In the 3D mode, an electrical signal is constantly applied to the dynamic optical element 16 and the power of the electrical signal varies as a function of the separation distance D to change the focal length of the optical arrangement 15 of the optical stylus 10 accordingly. The working range between the distal end of the optical stylus 10 and the position-encoded surface 50 where the position-encoding patterns 52 can still be detected may extend for example up to 15 cm from the position-encoded surface 50.

In an alternative embodiment, the control or processing unit 24 is configured to switch automatically the optical stylus 10 from the 2D mode to the 3D mode and vice versa as a function of the output signal of the distance measuring sensor 32. In another non-illustrated embodiment, the control or processing unit is configured to switch the optical stylus from the 2D mode to the 3D mode and vice versa as a function of the output signal of a pressure sensor integrated in the distal end of the optical stylus.

Figure 5:
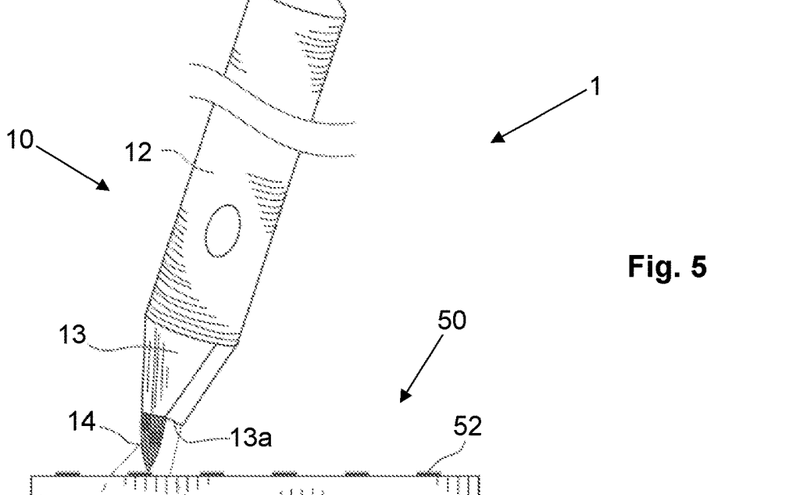
FIG. 5 shows an elevational view of an optical stylus, according to another embodiment of the invention, comprising at its distal end a brush comprising a bundle of filaments.
Figure 5A:
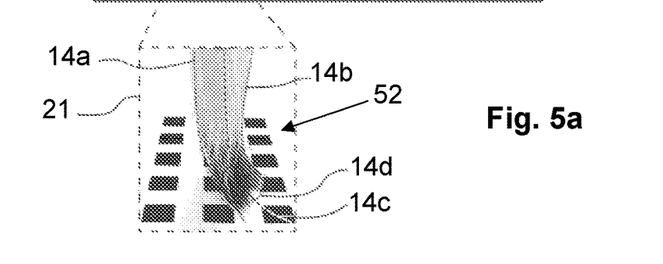
FIG. 5a shows a position-encoding pattern and the shape of the brush captured by the image sensor of the optical stylus in the configuration shown in FIG. 5.

The optical stylus 10 comprises a distal portion 13 comprising at its distal end an opening 13a centred on the optical path of the optical stylus 10 and leading inside the housing 12. Alternatively, a window made of a material transparent to the light in a given spectral range may be mounted inside an aperture at the distal end of the distal portion 13 of the housing 12. The distal portion 13 may have for example a frustum-cone shape, a cone with a sharp tip similar to a writing pen or a cone with a rounded distal end similar to a ballpoint pen. In an alternative embodiment, as illustrated in FIGS. 5 and 5a, the optical stylus 10 comprises a brush 14 made of a bundle of bristles, filaments or any other flexible material.

In this particular configuration, the position of the aperture or window 13a may be shifted aside from the longitudinal axis of the optical stylus 10 so the brush 14 does not hide or hide only partially the corresponding position-encoded pattern 52 such that the latter can still be identified by the pattern recognition software. The aperture or window 13a is therefore positioned such that an image of both the brush specific shape and the corresponding position-encoding pattern 52 may be captured together by the image sensor 20 to determine the position of the brush 14 relative to the position-encoded surface 50. According to the particular position of the aperture or window 13a in the illustrated embodiment of FIGS. 5 and 5a, the optical arrangement 15 may comprise additional mirrors on the optical path of the optical stylus 10 to adequately deflect the light beams.

Considering the multiple degrees of freedom of a brush having a bundle of filaments, not only the position of the brush 14 but also its shape, bend, tilt and twist may be acquired by the image sensor 20 and the corresponding optical signal may be processed to extract edges 14a, 14b, trace 14c and contact area 14d of the brush 14 using computer vision algorithms.

The processed data may be transferred to a host device comprising a screen or display such as a television, a computer, a tablet or a smartphone, in which the position-encoded surface 50 is integrated. In an embodiment, the position encoded surface 50 is made of a flexible material applied on the screen top surface of the host device. In an alternative embodiment, the position encoded surface 50 is a stand-alone device. The trace of the optical stylus can be generated on the screen of the host device according to the relative movements between the optical stylus and the position-encoded surface. In an embodiment, the trace 14c of the brush 14 can be generated on the screen of the host device taking into account the shape of the brush including twist, bend and/or orientation. The separation distance D between the brush 14 and position-encoded surface 50 may also be taken into account for analysing of the brush behaviour as it gives information regarding the pressure applied on the brush for estimation of the corresponding width of the trace 14c.

Figure 6A:
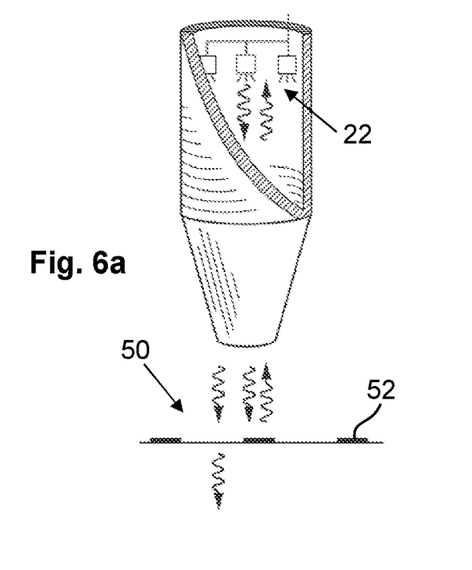
FIG. 6a shows a distal end portion of the optical stylus interacting with the position-encoded surface, wherein a light emitting unit is integrated inside the optical stylus according to an embodiment of the invention.

The optical stylus 10 may require a source of light for detection of position-encoding pattern 52 to avoid relying on the ambient illumination that can be weak in dark environment. In that respect, the housing 12 of the optical stylus 10 further includes a light emitting unit 22 comprising one or more LEDs 22a, 22b, 22c (FIG. 1) arranged to illuminate the position-encoding patterns 52 of the position-encoded surface 50. Light beams emitted by the light emitting unit 22 are either transmitted through the position encoded surface 50 or reflected from this surface 50 depending on whether light beams are incident to position-encoding patterns 52 or to a bare portion of the position encoded surface 50 surrounding the position-encoding patterns 52 as shown in FIG. 6a. As a result, the image sensor 20 only captures the reflected light beams in order to image the position-encoding patterns 52. In an advantageous embodiment, the intensity of the light emitted by the light emitting unit 22 may vary according to the output signal of the distance measuring sensor 32 such that the light intensity decreases, respectively increases as the optical stylus 10 moves towards or away from the position-encoded surface 50. In another embodiment, the emitted light beam is reshaped by the dynamic optical element, which acts a variable collimator, as a function of the signal provided by the control unit.

Figure 6B:
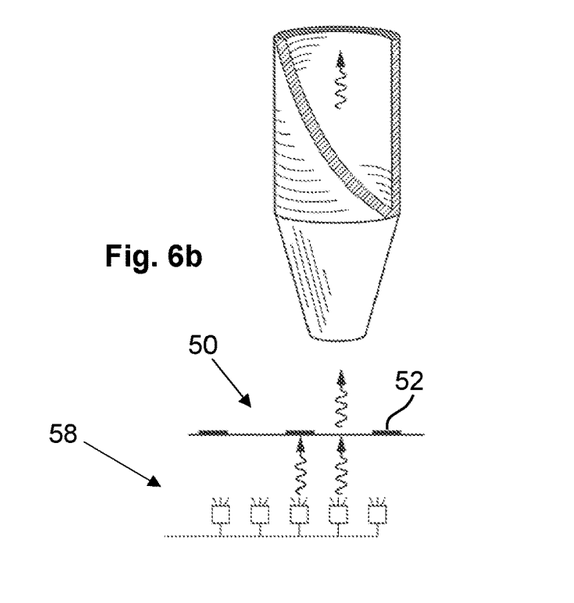
FIG. 6b shows a distal end portion of the optical stylus interacting with the position-encoded surface, wherein light emitting units are imbedded into the position-encoded surface according to another embodiment of the invention.

In an alternative embodiment, as illustrated in FIG. 6b, the source of light may be incorporated in the position-encoded surface 50 below one or more position-encoding patterns 52. In that case, emitted light either gets blocked or passes through the position-encoded surface 50 depending on its pathway. The light passing through the position-encoded surface 50 and collected by the optical stylus 10 carries information about the shape of the underlying position-encoding-pattern.

In order to decrease perceptibility to the user of the optical position determination device 1, the position encoding patterns 52 on the position-encoded surface 50 may be made transparent in the visible range of the light spectrum. This might be achieved for instance by employing inks with a complex absorption spectrum. In this case the employed light for detection of patterns may lie outside of the visible part of the spectrum. For instance, the optical position determination device 1 may use near-infrared light in the range of the 700 nm-1000 nm. These wavelengths are invisible for the human eye but still perceptible for a silicon image sensor.

Invisible position-encoding patterns 52 may be incorporated into a graphical representation output device, like a display screen. Being imperceptible for users, the position-encoding patterns 52 may not significantly alter the displayed image. In some embodiments, the display screen itself may be the source of light and may also display generated position-encoded patterns 52, which are used for later detection by the optical stylus 10. In that case, an additional patterned layer and illumination system must be incorporated into the display screen.

The disclosed optical stylus 10 may therefore be used together with conventional touch screen technology. This allows a rough determination of the optical stylus position by means of a touch sensor, so that position-encoding patterns may be generated only close to the optical input of the optical stylus, while the rest of the displayed frame remains unaltered.

In an embodiment, the optical stylus 10 is a stand-alone stylus. The housing 12 comprises to that effect a processing unit 24, a battery 26 and a memory 28. The recognition of any position-encoding pattern 52 as well as calculation of the position of the optical stylus 10 are performed by the processing unit 24 which may run for example dedicated pattern recognition software and/or an image perspective analysis software stored in the memory 28. The computed data including position of the optical stylus may be transferred to the host device in real time or temporally stored in the optical stylus and later transferred to the host device for representation of a trace produced by the movement of the stylus and/or for permanent storage.

In another embodiment, the optical stylus may be configured to transfer data of the captured image of the position-encoding patterns 52 to the host device which may run the pattern recognition software and/or the image perspective analysis software to calculate the position of the optical stylus 10. Data transfer may be achieved through a cable linking the optical stylus to the host device. Alternatively, the housing 12 of the optical stylus 10 may comprise a wireless communication unit 30 to wirelessly communicate with the host device through for example a Wi-Fi or a Bluetooth protocol.

The battery may be recharged by the host device through the cable. Alternatively, the optical stylus 10 may be docked in a docking station for wireless charging.

The optical stylus 10 may comprise one or more additional sensors such as an accelerometer, a gyroscope, and a proximity sensor in order to facilitate position determination of the optical stylus 10.

Figure 7:
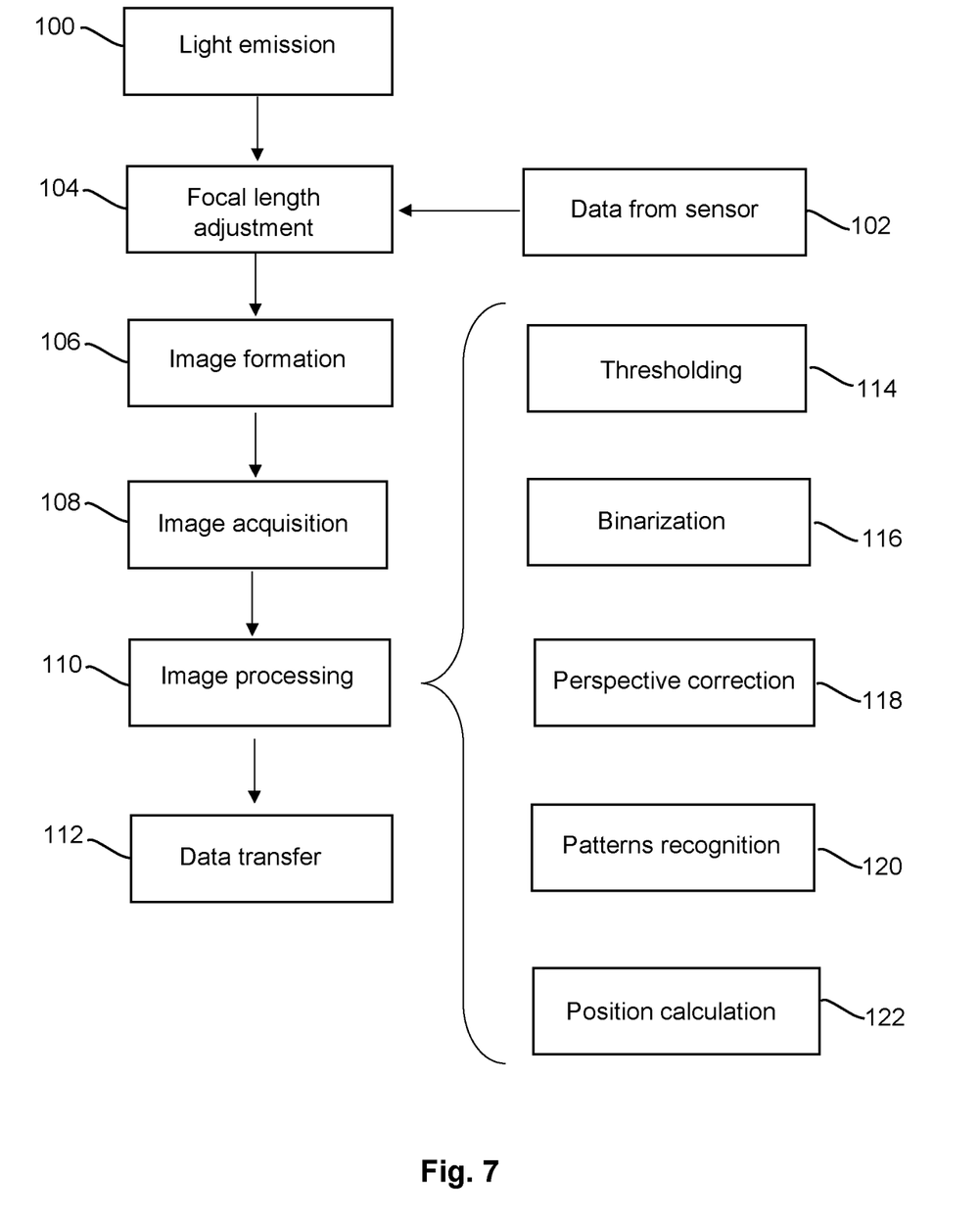
FIG. 7 is a block diagram for pattern recognition and position determination of the optical stylus relative to the position-encoded surface.

The block diagram of FIG. 7 essentially shows the different steps of an exemplary embodiment for determining the position of the optical stylus 10 relative to the position-encoded surface 50.

A first sept 100 consists in illumination of the position-encoded surface 50 by the light emitting unit 22.

A second step 104 may include adjustment of the focal length of the optical arrangement 15 of the optical stylus 10 by adjusting the dynamic optical element 16. For an open-loop approach the second step may require a prior step 102 consisting in determining the distance between the distal end of the optical stylus 10 and the position-encoded surface 50 by a distance measuring sensor 32 integrated in optical stylus housing 12. Adjustment of the focal length of the optical arrangement 15 may also be performed according to a feedback or closed loop approach as previously described, whereby prior step 102 is not performed.

A third step 106 consists in the formation of the image 21 by the optical arrangement 15 and subsequent step 108 consists in the acquisition of the optical signal by the image sensor 20.

In a particular embodiment, the step of acquiring the optical signal by the image sensor 20 may trigger the light emitting unit 22 to emit light pulses only at this stage. This may particularly be useful in the applications when the optical stylus 10 is moving, since short illumination pulse may reduce motion-related blurriness of the acquired optical signal. It also reduced energy consumption, thereby extending battery life.

Acquisition of the optical signal is followed by its processing by a processing unit 24 arranged in the optical stylus housing or externally, by a computing device. The signal processing may include any of the following process steps: image thresholding 114 and binarization 116, extraction of the rotation and tilt angles for subsequent perspective correction 118. The improved image is then processed by an algorithm for pattern recognition 120 and position calculation 122.

In an embodiment, the 2D position of the optical stylus is computed by identifying one or several tags or signs of the position-encoded surface 50 and extracting the position-related data provided by the tag/sign that corresponds to the position of the optical stylus relative to this surface. In a preferred embodiment, the position of the optical stylus is performed by solving the "Perspective-n-point" problem that allows position determination of the image sensor, including its 2D coordinates relative to the position-encoding surface, distance to this surface, and its orientation in space relative to this surface. The further position of any reference point of the optical stylus or its projection onto the position-encoding surface maybe inferred from parameters obtained by solving the Perspective-n-point problem.

For more accurate position determination of the optical stylus, the processing unit 24 or the external computing device may take into account additional information from auxiliary sensors. This additional information from auxiliary sensors may supplement and/or refine the position-related data deduced from the optical signal using sensor fusion algorithms. For instance, three-dimensional coordinates and orientation angles of the optical stylus may also be obtained or supplemented by one or more additional sensors such as an accelerometer, a gyroscope, a magnetometer and/or an inertial measurement unit (IMU). In case more than one sensor is implemented, data obtained by these sensors may be combined using fusion algorithms.

Upon processing of the optical signal of one or more image captured by the image sensor 20, useful information may be acquired for the position determination of the optical stylus. If the position-encoding patterns 52 are asymmetrical and they have determined orientation, the rotation angle 54 between the optical stylus 10 and the position-encoded surface 50, as shown in FIG. 2a, may be determined. Moreover, further analysis of optical signal may reveal perspective distortion related to the tilt angle 60 of the optical stylus 10, as shown in FIG. 2, with respect to the normal of the position-encoded surface 50 which is correlated with a one-point perspective angle 56 (FIG. 2a). This information may be used for perspective correction and simplification of patterns recognition. Further analysis of the optical signal may include calculation of the field of view (FOV) that is directly related to the distance separation between a reference point of the optical stylus, for example its distal end, and the position-encoded surface 50.

The IMU can fully determine the 3D pose of the optical stylus 10 (3D coordinates and orientation) with respect to a reference position that could be estimated by the processing of an image of any encoding-pattern 52 of the encoded surface 50 acquired by the image sensor 20. Therefore, the estimated 3D pose of the optical stylus 10 may be refined using a combination of both the image of any encoding-pattern 52 and the output of the IMU. The IMU-based position estimation can also take over image-based position estimation once any encoding-pattern 52 is too small or too much out of focus in order to give a robust estimation of the 3D pose of the optical stylus 10.

Finally, a subsequent step 112 is performed for transferring position-related data to a host device for graphical representation. Comparison of the current position with the one calculated previously, together with information from sensor such as accelerometer may also reveal the information related to the optical stylus motion.

| Reference list |
|---|
| Optical position determination device |
|   Optical stylus 10 |
|     Housing 12 |
|       Distal portion 13 |
|         Aperture 13a |
|       Brush 14 with a bundle of filaments |
|         Edges 14a, 14b |
|         Trace 14c |
|         Contact area 14d |
|     Optical arrangement 15 |
|       Dynamic optical element 16 |
|         Fixed-focal lens (one embodiment) |
|         Actuator |
|           Piezo-element |
|         Electrically tunable lens (one embodiment) |
|           Liquid or polymer lens |
|             First and second liquids 16a, 16b |
|       Optical components 18 |
|         Filter, mirror, aperture, fixed-focus lens |
|     Functional button 19 |
|     Image sensor 20 |
|       CCD/CMOS sensor |
|     Captured image 21 |
|     Light emitting unit 22 |
|       LEDs 22a, 22b, 22c |
|     Processing unit 24 |
|     Battery 26 |
|     Memory 28 |
|     Wireless communication unit 30 |
|       Bluetooth module |
|       Wi-Fi module |
|     Additional sensors 32 |
|       Distance measurement sensor |
|       Accelerometer sensor |
|       Gyroscope |
|       Proximity sensor |
|       Distance measuring sensor |
|       Inertial Measurement Unit (IMU) |
| Position-encoded surface 50 |
|   Position encoding pattern 52 |
|   Rotation angle 54 |
|   one-point perspective angle 56 |
|   Light sources 58 |
| Tilt angle 60 |

The invention claimed is:

1. An optical stylus for an optical position determination device comprising a position-encoded surface having different position-encoding patterns, the optical stylus comprising:

an image sensor for capturing at least one image of any position-encoding pattern of the position-encoded surface, an optical arrangement comprising a dynamic optical element configured to be electrically actuated in order to adjust the focal length of the optical stylus as a function of a separation distance (D) between a reference point of the optical stylus and the position of any position-encoding pattern to have a substantially in-focus position-encoding pattern corresponding to the position of the optical stylus, a control or processing unit configured to actuate the dynamical optical element to adjust the focal length of the optical stylus as a function of a control signal, and an aperture or a window at a distal end of the optical stylus, wherein the optical stylus is adapted to identify any substantially in-focus encoding-pattern of the position-encoded surface independently of said separation distance (D) for position determination of the optical stylus relative to said surface, wherein the optical stylus further comprises a distance measurement sensor to output said control signal as a function of said separation distance (D), wherein the control or processing unit is configured to control the dynamic optical element according to either a 3D mode or a 2D mode, and wherein, in said 3D mode, an electrical signal is applied to the dynamic optical element, the electrical signal varying as a function of said separation distance (D), to vary the focal length of the optical stylus accordingly.

2. The optical stylus according to claim 1, wherein in said 2D mode, wherein no varying electrical signal is applied to the dynamic optical element such that the focal length of the optical stylus remains constant and any encoding-pattern is substantially in-focus when the distal end of the optical stylus is in contact or within a range up to 5 mm to said position-encoded surface.

3. The optical stylus according to claim 2, wherein said control or processing unit is configured to switch the optical stylus between said 2D mode and 3D mode as a function of the output signal of the distance measuring sensor.

4. The optical stylus according to claim 2, further comprising a functional button electrically connected to the control or processing unit to switch the optical stylus between the 2D mode and the 3D mode.

5. The optical stylus according to claim 2, further comprising a pressure sensor located in the tip of the stylus, wherein said control or processing unit is configured to switch the optical stylus between said 2D mode and 3D mode as a function of the output signal of the pressure sensor.

6. The optical stylus according to claim 1, wherein the distance measurement sensor is a time-of-flight sensor.

7. The optical stylus according to claim 1, wherein the dynamic optical element is either of the two following elements:

a liquid or polymer lens electrically actuable to adjust said focal length, a fixed-focus lens mounted on an actuator configured to shift the fixed-focus lens along an optical path of the optical stylus to adjust said focal length, the actuator being preferably a piezoelectric element.

8. The optical stylus according to claim 1, further comprising at least one or both selected from the group consisting of: a light emitting unit adapted to illuminate any position-encoding pattern, and an Inertial Measurement Unit (IMU).

9. The optical stylus according to claim 1, further comprising a battery and an electrical circuit including the processing unit, the image sensor and a memory, the battery being configured to power the electrical circuit, wherein the memory stores an image processing and/or a pattern recognition algorithm for determining the position of the optical stylus relative to the position-encoded surface.

10. The optical stylus according to claim 1, further comprising at a distal end a specific shape for writing, painting or calligraphy application, said specific shape being in the form of a brush comprising a bundle of filaments, another flexible tip or a pen-like tip, wherein said aperture or said window is located at the distal end of the optical stylus such that an image of both said specific shape and the corresponding position-encoding pattern may be captured together by the image sensor.

11. An optical position determination device comprising the optical stylus according to claim 1, and a host device comprising a screen, and a position-encoded surface having different position-encoding patterns, wherein the host device is configured to receive data from the optical stylus to generate on the screen a trace following the motion of the optical stylus relative to the position-encoded surface.

12. The optical position determination device according to claim 11, wherein the position encoded surface is an integral part of the host device or is a stand-alone position encoded surface.

13. The optical position determination device according to claim 11, wherein the position encoded surface is made of a flexible material applied on the screen top surface of the host device.

14. The optical position determination device according to claim 11, wherein the different position-encoding patterns of the position-encoded surface are transparent in the visible range of the light spectrum.

15. The optical position determination device according to claim 12, wherein the host device or the stand-alone position encoded surface comprises one light or more light sources, configured to emit light outside the visible range of the light spectrum and arranged below the position-encoded surface to back illuminate each of the position-encoding patterns.

16. A method of determining the position of an optical stylus relative to a position-encoded surface comprising different position-encoding patterns, the optical stylus comprising:

an image sensor for capturing at least one image of any position-encoding pattern of the position-encoded surface, an optical arrangement comprising a dynamic optical element configured to be electrically actuated, a distance measurement sensor for measuring a separation distance (D) between a reference point of the optical stylus and the position of any position-encoding pattern, and a control or processing unit to control the dynamic optical element, wherein the control or processing unit is configured to control the dynamic optical element according to a 3D mode or a 2D mode, and wherein, in said 3D mode, the method comprises the steps of:

a. holding the optical stylus in the direction of the position-encoded surface, b. applying an electrical signal to the dynamic optical element, wherein the electrical signal is varying as a function of said separation distance (D) measured by said distance measurement sensor, and actuating the dynamic optical element to adjust the focal length of the optical stylus as a function of said electrical signal, c. acquiring by the image sensor the optical signal of the image formed by the optical arrangement of a substantially in-focus position-encoding pattern of the position-encoded surface, and d. processing the optical signal to determine the position of the optical stylus relative to the position-encoded surface.

17. The method according to claim 16, wherein the optical stylus further comprises a gyroscope and/or an accelerometer, wherein the position of the optical stylus is computed based on both the optical signal acquired by the image sensor and data acquired by said gyroscope and/or accelerometer, or data acquired by said gyroscope and/or accelerometer.

18. The method according to claim 16, wherein the optical stylus further comprises a light emitting unit, wherein the light intensity of the light emitting unit is controlled as a function of the output signal of the distance measurement sensor.

19. The method according to claim 16, wherein data representing image perspective of any of said position-encoding pattern captured by the image sensor are processed by the processing unit of the optical stylus which runs a computer vision algorithm for determining the position of the optical stylus prior sending to the host device position-related data for displaying a trace on the screen following the relative movement of the optical stylus relative to the position-encoded surface.

20. The method according to claim 19, wherein the hue, stroke width and/or shape of said trace is modulated as a function of any or a combination of two or more of the following parameters of the optical stylus: speed, acceleration, orientation and tip pressure on the position-encoded surface.

* * * * *